United States Patent
Corinne

(10) Patent No.: US 7,224,310 B2
(45) Date of Patent: May 29, 2007

(54) METHOD AND DEVICE FOR THE RECOGNITION OF THE ORIGIN OF ENCRYPTED DATA BROADCASTING

(75) Inventor: Le Buhan Corinne, les Paccots (CH)

(73) Assignee: Nagravision S.A., Cheseaux-Sur-Lausanne (CH)

(*) Notice: Subject to any disclaimer, the term of this patent is extended or adjusted under 35 U.S.C. 154(b) by 417 days.

(21) Appl. No.: 10/455,321

(22) Filed: Jun. 6, 2003

(65) Prior Publication Data
US 2004/0098603 A1 May 20, 2004

(30) Foreign Application Priority Data
Nov. 20, 2002 (CH) .................................. 1938/02

(51) Int. Cl.
*H04L 9/00* (2006.01)
*H04K 1/00* (2006.01)
(52) U.S. Cl. ........................... 342/195; 713/193; 902/2
(58) Field of Classification Search .................. 342/56, 342/417, 420, 424, 442–445, 195, 198; 902/2; 380/203; 705/57; 713/190, 191, 193
See application file for complete search history.

(56) References Cited

U.S. PATENT DOCUMENTS

| | | | | |
|---|---|---|---|---|
| 5,381,150 A | * | 1/1995 | Hawkins et al. | 342/13 |
| 5,608,411 A | * | 3/1997 | Rose | 342/417 |
| 5,689,559 A | * | 11/1997 | Park | 380/203 |
| 5,724,047 A | * | 3/1998 | Lioio et al. | 342/442 |
| 5,936,575 A | * | 8/1999 | Azzarelli et al. | 342/362 |
| 6,233,459 B1 | * | 5/2001 | Sullivan et al. | 455/456.2 |
| 6,392,598 B1 | * | 5/2002 | Jones et al. | 342/442 |

(Continued)

FOREIGN PATENT DOCUMENTS

EP          1078524          2/2001

(Continued)

OTHER PUBLICATIONS

Search Report.

*Primary Examiner*—Dao L. Phan
(74) *Attorney, Agent, or Firm*—Harness, Dickey & Pierce, P.L.C.

(57) ABSTRACT

The object of the present invention is intended to solve the problem of the broadcasting of conditional access data where certain parts must be accessible either for technical reasons or for commercial reasons.

This object is reached by a method for processing a conditional access digital data set by a user unit (DVR) comprising a security module (SM), this data being divided into at least two parts, a first part (FL1) including the majority of the data set and a second part (FL2) including a secondary part of the data set, characterized in that the first part (FL1) is encrypted by first control-words (CWB) and subject to first access conditions whilst the second part (FL2) is encrypted by second control-words (CWA) and subject to second access conditions, and includes the following steps:
verifying if the second access conditions are fulfilled,
decrypting the second part (FL2) of the data set by second control-words (CWA),
immediately inserting a mark on the decrypted data, this mark being modulated according to a parameter (K2) specific to the security module (SM) and known by the managing center.

16 Claims, 1 Drawing Sheet

U.S. PATENT DOCUMENTS

| | | | |
|---|---|---|---|
| 6,668,326 B1 * | 12/2003 | Sella et al. | 726/6 |
| 6,857,077 B1 * | 2/2005 | Choulette et al. | 726/21 |
| 6,904,522 B1 * | 6/2005 | Benardeau et al. | 713/156 |
| 2003/0182579 A1 * | 9/2003 | Leporini et al. | 713/201 |

FOREIGN PATENT DOCUMENTS

| | | |
|---|---|---|
| FR | 2812147 | 1/2002 |
| WO | 02069638 | 9/2002 |
| WO | WO 02069638 | 7/2003 |

* cited by examiner

METHOD AND DEVICE FOR THE RECOGNITION OF THE ORIGIN OF ENCRYPTED DATA BROADCASTING

PRIORITY STATEMENT

This application claims priority under 35 U.S.C. §119 from Switzerland Patent Application No. 2002 1938/02, filed on Nov. 11, 2002, in the Swiss Intellectual Property Office, the disclosure of which is incorporated herein in its entirety by reference.

BACKGROUND

1. Field

This invention concerns a content marking system, in particular in the domain of digital video recorders.

2. Description of Related Art

The introduction of personal digital recorders (PVR or DVR) for video content has opened the way to new applications such as the broadcasting of a pre-recorded content when desired.

This storage and reproduction ability offers the opportunity of the abusive use of the content. In fact, this content is generally under copyright protection and its reproduction subject to very strict conditions.

The content, as defined within the scope of this application, includes an audio part and a video part. It is sent to the recorders in an encrypted form by means of control words (CW) which are frequently changed.

This technique, initially developed for broadcasting, poses some problems when recording and reproducing. A known problem is the time displacement inside the content, i.e. fast rewind and fast-forward.

In this example, the encryption of the content does not allow the setting of the time and in particular finding the beginning of a group of images. A group of images includes a complete frame i.e. containing all the data included in an image and differential frames, i.e. containing information about differences in relation to the previous frame.

Fast forward and fast rewind need to be located in complete frames, also referred to as I-frames, to start a new reading. Differential frames are referred to as P/B type frames.

A first solution has been described in application WO 02/069638, which consists of encrypting type I and P/B frames in a different way. This solution is satisfactory for selectively increasing the security of the content without excessively delaying the deciphering period of the data.

If a digital video recorder is in use, the ideal is to have unscrambled I-frames in order to allow an easy displacement in the content. Nevertheless, although I-frames allow to access to the contents in a very partial way, leaving unscrambled images stored in the storage unit without protection is not desired.

SUMMARY

An object of this invention is to provide a method for allowing a great flexibility of use in digital video recorders whilst implementing safeguards on the broadcasting of images submitted to access conditions.

More broadly, this method is intended to solve the problem of conditional access information broadcasting where certain parts must be accessible either for technique reasons (for example, in a digital recorder: pre-treatment of the content to take the main parameters and allow indexing, selective research, fast rewind and fast forward . . . ) or for commercial reasons (view of the content to attract the client).

This objective is reached by using a method for processing conditional access digital data set by a user unit (DVR) comprising a security module (SM), this data being divided into at least two parts, a first part (FL1) including most of the data set and a second part (FL2) including a secondary part of the data set, characterised in that the first part (FL1) is encrypted by first control-words (CWB) and subjected to first access conditions, the second part (FL2) is encrypted by second control-words (CWA) and subjected to second access conditions, including the following steps:

verifying in the security module (SM) whether the second access conditions are fulfilled, if so, decrypting the second part (FL2) of the data set by the second control-words (CWA), immediately inserting a mark to the decrypted data, this mark being modulated according to a parameter (K2) specific to the security module (SM) and known by a managing centre.

"User unit" is intended to be a digital recorder such as described above, but also a pay-TV decoder, or more broadly a personal computer. The data set can be a transmitted stream or a set stored on storage means such a CD or a DVD.

Systems that allow the integration of a signature inside an image are known, this signature should resist to the different manipulations of the image (zoom, compression, decompression . . . ). This signature is a mark hidden in the image and that is invisible to the eye; its location is generally determined by a key while the alteration of the image depends on the mark desired to be inserted in the image. This mark can be the unique number UA of the security module.

There are two great marking groups depending on whether the original image is necessary or not to acquire the signature.

These marking processes are of course applied on unscrambled images, that is to say, after deciphering and at least partial decompression.

According to the invention, the parameter specific to a security module can be either the specific mark location key or the mark content itself, or also a combination of both elements. The reason to link this parameter to the security module is that deciphering I-frame control-words is carried out preferably in such a module. Thus, the mark is associated with the element responsible for the free access to images protected by the control-words allowing their identification during a further acquisition of stolen images.

This module is usually a microchip card where keys that permit deciphering are stored. This module is not necessarily removable but can also have the form of a circuit dedicated to that purpose and integrated in the user unit.

For example, to find the origin of an image broadcast on the Internet it is possible to extract the marking thanks to the key owned by the managing centre, such as the copyright surveillance authority, to determine the value of the mark and thus permitting the discovery of the unique number of the responsible security module.

Thanks to this marking, it is possible to find the apparatus that has allowed this non-authorised broadcasting. As I-frame control words are deciphered in the security module, it is the number of this module that will preferably be used as a marking.

Therefore, a recorder according to the invention includes a deciphering module that is closely associated to the marking module. Thus, once deciphered, I-frame becomes immediately duly marked by a mark specific to this apparatus (or its security module) before being stored on a storage unit.

Therefore, the method of the invention consists in authorising the deciphering of a part of the data set provided that this part is marked with a mark specific to the user unit that carried out the deciphering.

There are several marking techniques, known as "watermarking" or "fingerprinting". More information will be found on work "Information Hiding, techniques for steganography and digital watermarking" by Stephan Katzenbeisser and Fabien Petitcolas.

According to these techniques, a secret key determines the location of the mark or the print on the image. The mark itself comprises the security module and/or the digital recorder unique number. This mark can also comprise test fields in order to verify the validity of a mark when rereading.

As indicated above, this mark is invisible and does not disturb the user in any way.

Independently of how this mark is created, it is necessary for the content managing unit to be able to identify the place where the marked frames have been deciphered and for that purpose the managing centre must know the marking key.

This mark can contain several fields, for example a field for identifying the security module and another field for identifying the recorder.

According to the essence of the invention, the apparatus in charge of deciphering the frames is not necessarily a recorder, that is to say, that it has a storage unit. It can be a simple decoder for the immediate visualisation of deciphered contents. Thus, frames deciphered by this decoder will be marked in the same way as on a recorder and if these images are broadcast larger than on the user visualisation display, this mark will allow the identification of the said decoder.

According to an embodiment, frames that are decrypted in this way and then marked are encrypted again by a local key before being stored in the storage unit. Thus, the manipulation of these images will be much easier since the same local key is applied on all the images from the same content: deciphering any image only needs this unchanging key.

One of the objects of the invention is the management of the marking parameter from the managing centre. In a first embodiment, this parameter is the unique number UA of the security module or derives directly from the said unique number (such as a function "XOR" of the number) and is used as data for the mark, the location key being common to every user unit.

In a second embodiment, the managing centre determines the value of the parameter and/or the key and can change it depending on the needs by taking advantage of the communication mechanisms of a conventional conditional access system.

This system is characterised in the transmission of the entitlement management message (EMM) and the entitlement control message (ECM) containing the control-words (CW). These management messages can contain individually addressed markings parameters.

BRIEF DESCRIPTION OF THE DRAWING

The invention will be better understood by means of the following detailed description with reference to the figure given as a non-limiting example.

DESCRIPTION OF EXAMPLE EMBODIMENTS

Figure 1:
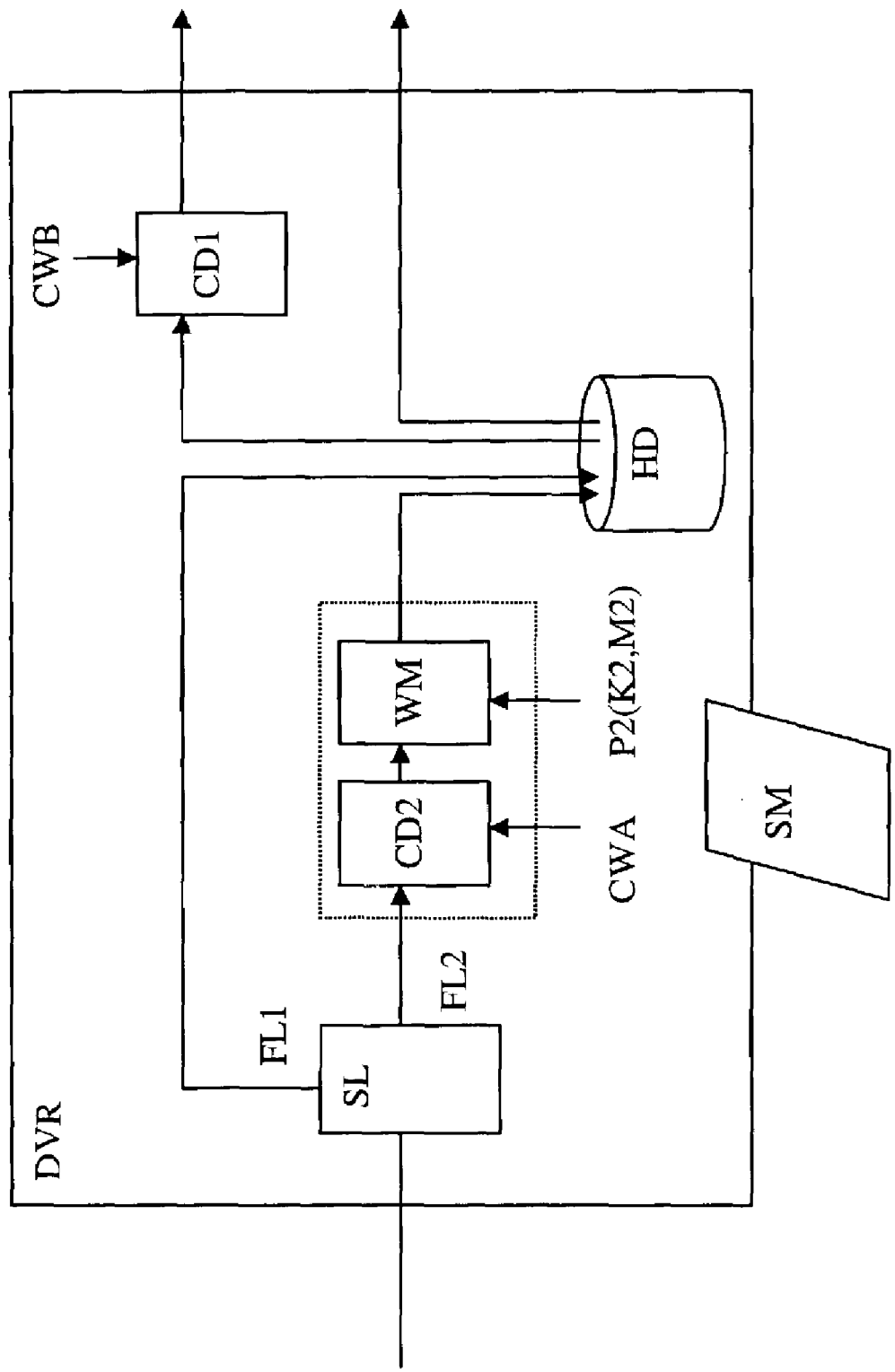
FIG. 1 is a is a block diagram of a digital recorder according to an example embodiment.

In FIG. 1, the digital recorder DVR includes a first data stream selection level SL, responsible for separating the two streams encrypted according to different control-words.

The example is given here for a first stream that has frames of type I (FL2) and frames of type P/B (FL1) but can also apply to other types of division of audio/video stream, such as, a first stream including the product itself and a second stream including simplified frames extracted from the initial content at regular intervals but of lower quality.

FIG. 1 shows an embodiment comprising storage. Both streams are ciphered according to respective control-words CW illustrated by keys CWA and CWB. Stream FL1 is directly stored in its ciphered form.

Stream FL1 is ciphered by a first set of control-words illustrated by the key CWB. This key is provided by the security module SM in charge of deciphering the control messages ECM and of returning the deciphered control-words. This module also verifies the conditions for deciphering, in particular, if the data stream in question is entitled. It should be noted that conditions associated to the words decryption are in general different from those related to data stream FL2.

Data stream FL2 is treated in a different way. It is first deciphered in the deciphering module CD2 by the control-words CWA provided by the security module SM then immediately marked in the marking module WM. The security module nevertheless verifies the rights related to this stream to determine if the said module is entitled. The mark is determined according to a marking parameter P2 which may come from the security module SM, from the digital recorder DVR or from the set formed by the security module and the recorder DVR. In fact, it is possible, during a starting phase, to transmit the unique security module number SMUA and the unique recorder number DVRUA to a managing centre that determines a marking parameter P2. This parameter may comprise a key K2 determining the location of the mark and the content M2 of the said mark.

This centre can also be used to determine the origin of the marked images if they were found elsewhere than on the user unit authorised to use these images.

As indicated above, parameter P2 can either be a constant parameter specific to a security module, or it can be variable and transmitted from the broadcasting centre. Thus, the strength of the marking is greatly reinforced by a mark that has a variable content or location.

It is possible to associate the location of the said mark to a type of content, for example, depending on the origin of the content broadcasting producer. When establishing the origin of the content broadcasting, the owner is first established and then, depending on this owner, the position of the mark is determined and the mark itself extracted.

This embodiment allows a global management only for the marking of a content broadcaster. The latter is then free to set up one or the other of the possible embodiments of the invention to carry out the individual marking of each of its receivers. In particular, the managing centre only needs to know and manage its own receivers.

The content broadcaster can change the common marking parameters of its receivers and transmit them to security modules by means of global addressing entitlement management messages EMM well known in the conventional conditional access systems.

Within the scope of the invention, provision is made to allow the variation of the mark location according to the image in question. The mark location key changes for each image according to a list of keys.

One of the classic attacks, known as collision attack, which aims to cancel the traceability of the content consists in averaging several images of several receivers/recorders corresponding to the same original frame but individually marked with a different marking and the same marking location key. The resulting marking does not allow any further unambiguous identification of the source.

To avoid this drawback, a possible embodiment of the invention consists in allowing the variation of the marking key as a function of the security module rather than the mark itself which can then simply consist of a detecting confirmation mark. However, this solution requires exhaustive research of the confirmation mark among all the attributed keys and among all the security modules depending on the managing centre previously identified. There are millions of these modules and thus research of this type is too expensive.

Therefore, in a preferred embodiment of the invention, a supplementary hierarchy is established to identify a group of security modules before searching the module in question within this group. This group of security modules corresponds to the addressing group of the messages EMM-S well known in the conventional conditional access systems. Within a given group, all the security modules make the same marking (same key, same mark) allowing the identification of only the group. Within a group, an individual marking for each security module can then be carried out.

In this preferred embodiment of the invention, three marking levels will be thus inserted in a given content:

Identification of the content broadcaster,

Identification of the group of security modules (among the security modules of the previously identified broadcaster), Identification of the security module (within the previously identified group of modules).

These three levels can be found on each marked image or divided into different images.

Parameter P2 is therefore a dynamic parameter that includes the intervention of a data set, either data location keys as previously described or the mark content itself.

This parameter P2 is extremely delicate data, knowledge of this data permitting the cancellation of the marking since the usual marking algorithms are reversible. Therefore, its transfer and use must be protected against any access or illicit modification from outside the security module and the marking module.

In particular, dynamism of this parameter prevents a fix registration on the marking module and justifies the use of the classic communication mechanisms in a conditional access system, such as the messages EMMs, to transmit in a securitised manner parameter P2 from the managing centre to the security module that will consequently decipher and update it.

Furthermore, as marking cannot be carried out in the security module because it does not have the necessary means for the direct treatment of images, the security module must transmit parameter P2 to the marking module in the receiver/recorder. For this reason, the same protection techniques may be used for the transmissions between both modules and those applied to content deciphering keys (control-words CWA, CWB). A solution is notably described in the patent EP1078524.

Thanks to the increasing capacity of the removable security modules (chips cards), the marking module WM can be integrated in such a card and the parameter P2 does not come out from this card anymore.

Although the preferred form of the reception apparatus is a receiver to receive broadcasted data, the same marking method can also apply to data contained on a CD-ROM and a DVD for example, and used by the said apparatus.

This data can represent a film, a documentary or any other audio/video content.

The invention claimed is:

1. Method for processing conditional access data by a user unit comprising a security module, the data being divided into at least two parts, a first part including the majority of the data and a second part including a secondary part of the data, wherein, at data generation, the first part is encrypted by first control-words and subject to first access conditions whilst the second part is encrypted by second control-words and subject to second access conditions, the method comprising the following steps at data reception:

verifying in the security module whether the second access conditions are fulfilled;

decrypting the second part of the data by means of the second control-words, thus producing second part image data; and inserting at least one mark in the decrypted second part, the at least one mark being determined according to a marking parameter specific to the security module, said mark altering the second part image data.

2. Method according to claim 1, wherein the second part of the data are decrypted only if the verification carried out by the security module is successful.

3. Method according to claim 1, wherein the data are audio/video data having frames of type I and frames of type P/B and the second part is formed by frames of type I.

4. Method according to claim 1, wherein the data are audio/video data defining a visual event and the second part is formed by the first minutes of the event.

5. Method according to claim 1, wherein the second part is formed by at least one image in which the at least one mark is added in a location defined by the marking parameter.

6. Method according to claims 1, wherein the second part is formed by at least one image to which the at least one mark is added according to the marking parameter, the marking parameter comprising at least one location key defining a predefined location.

7. Method according to claim 6, wherein the at least one mark content derives directly from the security module unique number.

8. Method according to claim 1, wherein a managing center transmits, for a given user unit, the marking parameter in an encrypted form.

9. Method according to claim 8, wherein the marking parameter is included in a management message of a conditional access system.

10. Method according to claim 6, further comprising:

inserting several marks, each characterising an entity of the production and transmission of the data.

11. Method according to the claim 3, wherein the marking parameter includes a plurality of location keys, each key being used sequentially and associated to an image of the second part.

12. User unit having a security module, designed for the processing of a data set encrypted by a plurality of control-words, the data set being divided into at least two parts, a first part including the majority of the data set and a second part including a secondary part of the data set, wherein, at data generation, the first part is encrypted by first control-words and subject to first access conditions, while the second part is encrypted by second control-words and subject to second access conditions, comprising, at data reception:
- a unit for verifying in the security module whether the second access conditions are fulfilled;
- a decrypting unit for decrypting the second part using the second control-words to produce second part image data; and
- an inserting unit for inserting a mark in the decrypted second part, the mark being determined according to a marking parameter specific to the security module, said mark altering the second part image data.

13. User unit according to claim 12, wherein the second part includes at least one video image.

14. User unit according to claim 13, wherein the marking parameter includes at least one location key defining a predefined location in the at least one video image of the second part and a mark content.

15. User unit according to claim 14, wherein the marking parameter includes a plurality of location keys, each key being successively applied to the at least one video image of the second part.

16. User unit according to claim 12, wherein the security module comprises:
- a decrypting unit for decrypting the second part using the second control-words; and
- an inserting unit for inserting the mark in the decrypted second part.

* * * * *

UNITED STATES PATENT AND TRADEMARK OFFICE
CERTIFICATE OF CORRECTION

| | | |
|---|---|---|
| PATENT NO. | : 7,224,310 B2 | Page 1 of 1 |
| APPLICATION NO. | : 10/455321 | |
| DATED | : June 8, 2007 | |
| INVENTOR(S) | : Corinne Le Buhan | |

It is certified that error appears in the above-identified patent and that said Letters Patent is hereby corrected as shown below:

Title page, item 12 the inventor name should read: Le Buhan

Item 75 the inventor name should read: Corinne Le Buhan

Signed and Sealed this

Seventh Day of April, 2009

JOHN DOLL
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 7,224,310 B2 | Page 1 of 1 |
| APPLICATION NO. | : 10/455321 | |
| DATED | : May 29, 2007 | |
| INVENTOR(S) | : Corinne Le Buhan | |

It is certified that error appears in the above-identified patent and that said Letters Patent is hereby corrected as shown below:

Title page, item 12 the inventor name should read: <u>Le Buhan</u>

Item 75 the inventor name should read: <u>Corinne Le Buhan</u>

This certificate supersedes the Certificate of Correction issued April 7, 2009.

Signed and Sealed this

Twenty-eighth Day of April, 2009

JOHN DOLL
*Acting Director of the United States Patent and Trademark Office*